April 7, 1953        B. W. ANDRUS        2,633,879
SAWMILL CARRIAGE DOGGING APPARATUS
Filed Oct. 3, 1949        2 SHEETS—SHEET 1
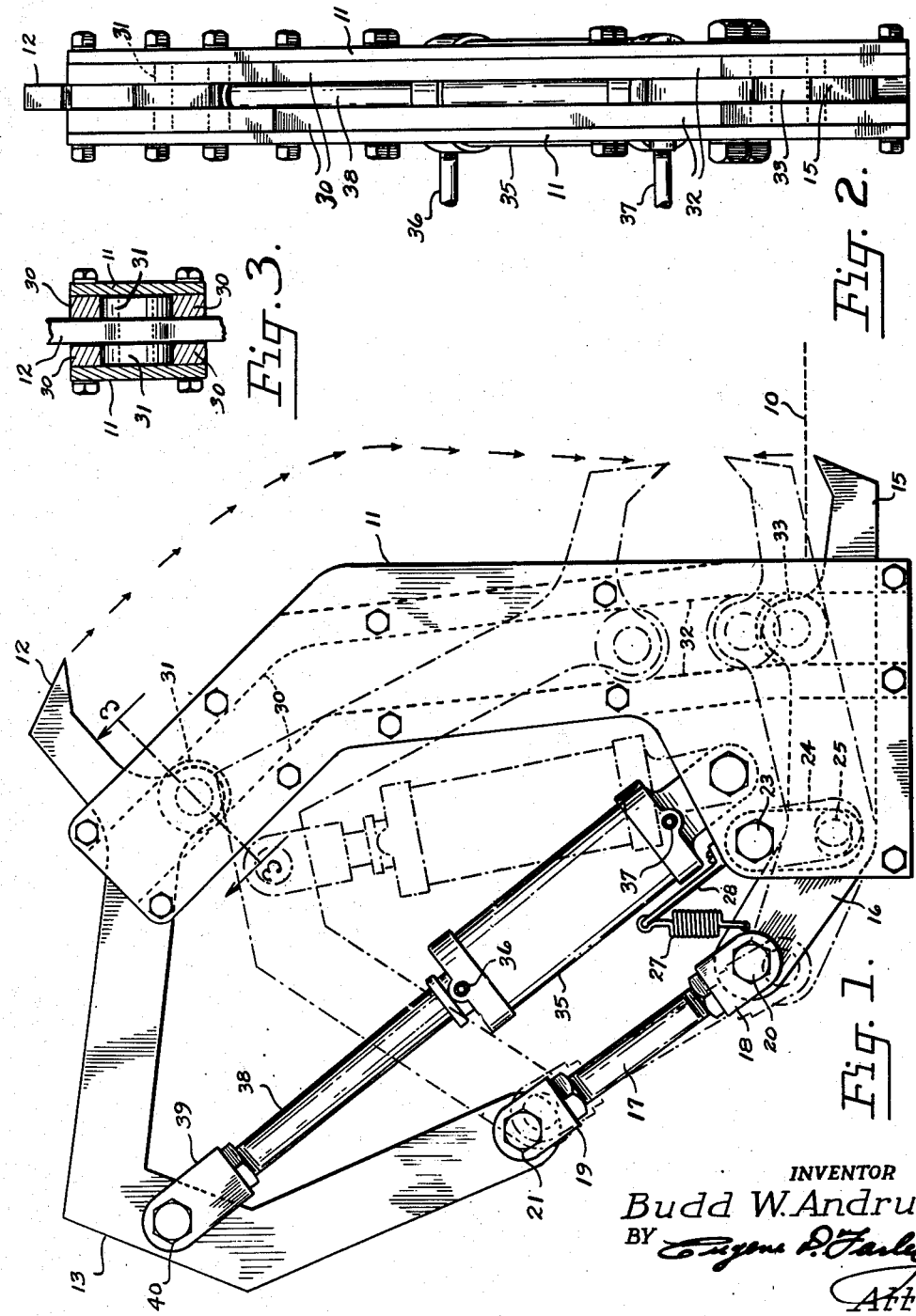
INVENTOR
Budd W. Andrus

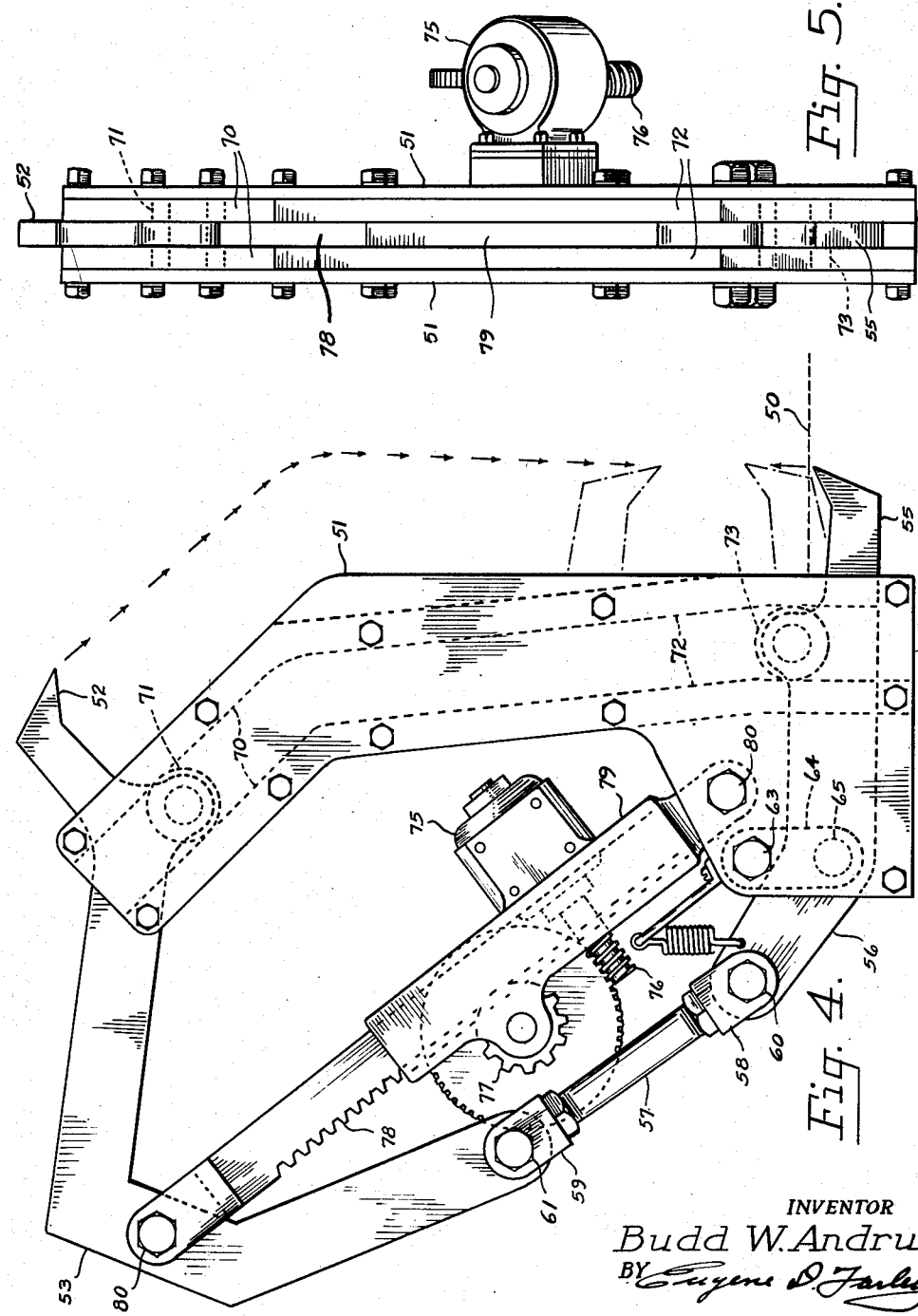

Patented Apr. 7, 1953

2,633,879

UNITED STATES PATENT OFFICE 2,633,879

SAWMILL CARRIAGE DOGGING APPARATUS

Budd W. Andrus, Eugene, Oreg., assignor to Monarch Forge & Machine Works, Portland, Oreg., a corporation of Oregon Application October 3, 1949, Serial No. 119,235

6 Claims. (Cl. 143—125)

The present invention relates to sawmill carriage dogging apparatus of the class commonly employed on sawmill carriages for holding a log or cant securely against the carriage knees while it is being reciprocated with respect to a saw.

Many types of sawmill carriage dogs have heretofore been devised, common types being those in which the upper dog and the lower dog are interconnected by motor means such as a pneumatic cylinder, the dogs being drawn together and separated by the piston acting on one of them in a given direction and the cylinder acting on the other of them in the opposite direction. It is the primary object of the present invention to provide sawmill carriage dogging apparatus of simplified construction in which the motive force need be applied directly to one of the dogs only, the force being transmitted through coupling means of suitable design to the other dog.

It is another object of the present invention to provide sawmill carriage dogging apparatus wherein means are provided for directing the path of the dogs relative to the face of the carriage knee, and for withdrawing them away from the saw line.

It is still another object of the present invention to provide sawmill carriage dogging apparatus in which one of the dogs is mounted pivotally with respect to the frame of the apparatus, means being provided for maintaining this dog at a position of maximum displacement with respect to the other of the dogs.

Still a further object of the present invention is the provision of sawmill carriage dogging apparatus wherein the dogs operate effectively on logs and cants of various sizes and contours without being projected excessively beyond the face of the knee.

It is still a further object of the present invention to provide a sawmill carriage dogging apparatus having relatively few moving parts and being relatively accessible for repair.

The manner in which the foregoing and other objects of the present invention are accomplished will be apparent from the following specification and claims, considered together with the accompanying drawings wherein:

Figure 1 is a side view in elevation of the sawmill carriage dogging apparatus of the present invention in one of its embodiments;

Figure 2 is a front elevation of the apparatus of Figure 1;

Figure 3 is a detailed sectional view taken along the lines 3—3 of Figure 1;

Figure 4 is a side elevation of the apparatus of the present invention in another of its embodiments; and Figure 5 is a front elevation of the apparatus of Figure 4.

The presently described sawmill carriage dogging apparatus is adapted for use with sawmill carriages conventionally provided with from two to four head blocks adapted to support the log or cant, each head block being provided with a knee, i. e., an upright member associated with the head block by means of which the log or cant may be pushed toward or retracted from the saw line. Associated with each knee is a dogging device which is designed to grasp the log or cant and hold it securely against the knee. This device may be constructed integrally as part of the knee, as by being contained within the same, or may be affixed externally of the knee as a more or less independent member. The latter construction is of interest where it is desired to install a new type of dogging device on a sawmill carriage already in use.

The sawmill dogging apparatus of my invention may be applied within the knee or outside of it as described above. It comprises broadly an upper dog, a lower dog, one of the dogs being pivotally mounted intermediate its ends, coupling means for joining together the two dogs, and means for driving one of the dogs only, the driving motion being transmitted through the coupling means to the other of the dogs, thereby moving it in a direction opposite to the direction of motion of the driven dog.

Thus in a specific embodiment, my dogging apparatus may comprise an upper dog having an elongated shank or rear terminal portion. This shank may be bent toward the rear terminal portion of a lower dog and connected to the same through a substantially inflexible coupling. The lower dog may be attached pivotally to a frame member of the apparatus, or to the knee itself. A motor consisting of two relatively movable parts may be used to actuate the apparatus, one of the parts being attached to a frame member and the other to the upper dog, the point of attachment preferably being within the bend of the shank portion of the same. It will be apparent that, upon actuation of the motor means, the upper dog will be moved as a unit, both ends moving in the same direction. If the dogging end is moved downwardly, for example, the shank end also will be moved downwardly. Being connected to the rear terminal portion of the lower dog, the shank end of the upper dog will displace the rear terminal portion of the lower dog downwardly also. However, since the lower dog is attached pivotally to a frame member, the dogging portion of the same will be moved upwardly toward the downwardly moving upper dog. In this manner, effective dogging is obtained by applying the motive force to one of the dogs only.

Referring now more particularly to Figures 1 to 3:

In this embodiment, the presently described dogging apparatus is illustrated in conjunction with the head block 10 and knee 11 which, as described above, form conventional parts of the sawmill carriage assembly. The upper dog 12 which is designed to engage the upper part of the log or cant is formed with an elongated shank or rear terminal portion 13 which is bent downwardly toward the lower dog. Although the degree and manner of bending is variable to suit various installations, the shank portion 13 preferably is formed with a U-shaped, or yoke shaped, configuration.

The lower dog 15 is formed with a shank or rear terminal portion 16 which is bent upwardly at an angle appropriate to be connected with the shank of the upper dog. Although various types of couplings may be used for this purpose, the form selected for illustration comprises a threaded member 17 which screws in a lower cap 18 and an upper cap 19, the two caps being pivotally attached to the respective dogs by means of the bolts 20 and 21. Since the threaded member 17 is substantially inflexible, it will be apparent that any motion of one of the dogs will be transmitted to the other of the dogs.

Means are provided for attaching the lower dog pivotally to the frame of the apparatus or to the carriage knee. Such means in their simplest form may comprise simply a pin (not illustrated but corresponding to the pin 23) extending through the frame and also through the shank of the lower dog. However, for reasons which will be developed more fully hereinafter, it is preferred to pivotally mount the lower dog through the connecting link 24 connected at one of its ends to the frame of the apparatus through the pin 23, and at the other of its ends to the lower dog through the pin 25. In this manner, the lower dog is suspended so that the dogging end may be moved in both vertical and horizontal planes.

Means also are provided for maintaining the pivotally mounted lower dog normally in a position of maximum displacement with respect to the upper dog. This insures that, when the apparatus is not being used, the lower dog will be withdrawn to a plane below the upper surface of the head block 10 and will not interfere with logs or cants being placed thereon. The means employed for this purpose comprise broadly resilient means operatively associated with the lower dog, as for example the spring 27 attached at one of its ends to the bracket 28 projecting from the frame of the apparatus, and at the other of its ends to the shank 16 of the lower dog. Hence any upward motion of the lower dog will be against the tension of the spring 27, which, upon the release of the driving force, will return the lower dog to its position below the surface of the head block.

To direct the motion of the upper and lower dogs in a predetermined path with respect to the carriage knee, appropriately disposed guide means of suitable construction are provided. Thus the guide means for the upper dogs may comprise a pair of tracks 30 (Figure 3) placed in a position corresponding to the path which the upper dog is to follow. Attached to the upper dog, as to an extension thereon, is a pair of rollers 31 designed to ride on the track and therefore to guide the motion of the upper dog. It will be noted, to secure proper functioning of the upper dog as it is guided by rollers 31 moving along the tracks 30, the rollers should be on an imaginary line drawn between the point of the upper dog 12 and the pivot pin 21. When this is the case, the upper dog will move smoothly within the guides and maintain the desired path.

Similar guide means may be provided to direct the motion of the lower dog 15. Thus there may be provided tracks 32 in which move the rollers 33, which may be attached to an extension of the lower dog 15. The tracks 32 may be formed as a continuation of the tracks 30, and, like the latter, are positioned in such a manner as to determine the path of the lower dog in the desired manner. In this case also, it is desirable that the rollers 33 be positioned properly with respect to the point of the lower dog 15 and the pivot point by which it is suspended, i. e. the pin 23, the rollers being placed on the center line of these two reference points. When this construction is employed, the lower dog may be moved smoothly up and down the track 32, without describing an arc with reference to the surface of the knee, the connecting link 24 cooperating in this purpose.

A variety of actuating means, either manually operated or motor driven, may be employed to actuate the sawmill dogging apparatus of my invention. Whatever the actuating means, it need be applied to one of the dogs only as explained above. In the embodiment of Figures 1 to 3, the actuating means comprise a cylinder 35, which may be either an air cylinder or an hydraulic cylinder, and which is provided with conduits 36, 37 for the introduction and removal of fluid to and from the cylinder respectively. The cylinder may be of conventional construction and is provided with a piston (not shown) to which is attached the piston rod 38. The latter is attached through the cap 39 and the pin 40 to one of the dogs, preferably the upper dog. The point of attachment may be varied to suit the particular design employed, but, in the usual instance, will be within the bend of the dog, as well within the throat of the U-shaped shank 13 of the upper dog. As a result, when the piston rod is moved within the cylinder, both ends of the U-shaped upper dog will be moved in the same direction, the outer end being applied to the dogging operation, and the inner end being applied to the driving of the lower dog.

Other means may be applied, however, to operate the hereindescribed dogging apparatus. An alternate means is illustrated in Figures 4 and 5, the means comprising in this case a rotary motor. In the construction of this embodiment, the design of the dogging mechanism exclusive of the drive is analogous to that illustrated in Figures 1 to 3. Thus the apparatus is associated with the head block 50 and knees 51 of a sawmill carriage. An upper dog 52 is provided which has an extended shank portion 53 bent downwardly toward the shank of the lower dog. The lower dog 55 in turn has a shank 56 bent upwardly in the direction of the shank of the upper dog. The shank ends of the two dogging members are interconnected by means of the coupling 57, which is a threaded member screwing into the lower cap 58 and the upper cap 59, the screw connection making possible adjustments of the dogging arms. Pivotal attachment of the coupling to the respective dogs is obtained through the lower pin 60 and the upper pin 61.

Pivotal mounting of the lower dog is obtained by means of the pin 63 extending through the frame of the apparatus. As noted above, this pin may penetrate the lower dog directly, although it is preferred, as illustrated, to provide the connecting link 64, one end of which is pivotally attached to the frame through the pin 63 and the other end of which is pivotally attached to the lower dog through the pin 65. This makes possible the movement of the lower dog in a direction substantially parallel to the knee face.

Again as in the case of the previously described embodiment, guide means are provided for directing the motion of the upper and lower dogs in the desired path. Thus there is provided the upper track 70 in which ride the rollers 71 attached to an extension of the upper dog. Similarly there is provided the lower track 72 in which ride the rollers 73 attached to an extension of the lower dog.

The rotary driving means employed in the embodiment of Figure 4 to 5 may comprise, for example, either a reversible rotary hydraulic motor or an electric motor 75. The shaft of the motor is provided with a worm gear 76 which drives the pinion gear 77 which, in turn, drives the rack 78. The entire motor assembly is supported in the frame 79 pivotally attached to the frame of the dogging apparatus through the pin 80. The rack 78, which corresponds in its operation and function to the piston rod 38 of Figure 1, is, in turn, pivotally attached to the shank 53 of the upper dog through the pin 80. By operation of the motor 75, the rack 78 may be extended and retracted, this, in turn, raising and lowering both ends of the upper dog. Hence the dogging end is moved toward and away from the upper surface of the log or cant on the head blocks, while the shank end is moved toward and away from the shank end of the lower dog, thereby causing the latter to move away from and toward the bottom of the log.

The manner of use and operation of the embodiment described in Figures 1 to 3 is similar to that described in Figures 4 and 5. In both cases, a log or cant is placed on the head block and pushed by the nigger tightly against the knees. Whatever motor means are employed to drive the dogging apparatus then is set in motion, the action being such that the upper dog descends first. When it has engaged the log, the continued application of force by the driving means, e. g. the piston 38 or the rack 78, pushes downwardly on the upturned shank of the lower dog. Since the latter is pivotally mounted, the dogging end is forced upwardly until it engages the under side of the log or cant. Still further application of the driving force causes both dogs to penetrate the log or cant and to grip it securely.

Next the knees are adjusted until the log or cant is in proper position with respect to the saw line, and the carriage is reciprocated so that a section of the log or cant is sawed off. This process is repeated as often as desired, the dogs holding the object being sawed continuously during this operation. When it is desired to release the object, as in order to turn over the log, or to place a new log or cant in position, the motor means is moved in a direction opposite to that employed in setting the dogs. This causes first the release of the lower dog, and then, upon continued application of pressure, the release of the upper dog. During the disengagement, the downward motion of the dogging end of the lower dog 15 continues until it is arrested by contact of the under surface of the dog with the spacing member 41 which serves as a stop. The motion of the dogging end of the upper dog 12 continues until the actuating mechanism has been fully extended, the tracks 31 being sufficiently long to receive the roller 31 during the entire stroke of the driving mechanism. When thus in its terminal position, the upper dog, because of the inward bending of the track 31, is withdrawn out of the way so that the objects on the head block may be handled without interference from the dog. When the disengagement of the dogs is complete, the lower dog is held in retracted position below the level of the head block by the resilient means provided for this purpose. This occurs even though the lower dog is pivotally suspended and might tend to swing upwardly because of the weight of the apparatus. Hence the apparatus is ready to receive a new log or cant, whereupon the foregoing sequence of operation may be repeated.

It is to be understood that, although I have described and illustrated my invention with specific reference to the illustrated embodiments, equivalent embodiments will be apparent to those skilled in the art and are intended by me to be included within the scope of my invention as defined by the appended claims. Thus the motive force may be applied to either the upper or lower dog as desired. Similarly either one of the two relatively moving parts comprising the motor means may be attached directly to one of the dogs, the other part then being attached to a frame member. Still further, the precise form of the dogs and the point of attachment of the motive force thereto may be varied to suit the design of particular installations, provided, of course, the operating principle of driving both dogs by the application of force to one of the dogs only is preserved.

In this manner, I have provided sawmill carriage dogging apparatus which may be used effectively in conjunction with sawmill carriages and knees of the types commonly found. Furthermore, I have provided dogging apparatus having a superior action in that the extension of the dogs beyond the face of the knee is controlled throughout their entire path of motion at an optimum distance. Also, the dogging apparatus of my invention is provided with means for withdrawing both the upper and lower dogs at the conclusion of the sawing operation so that the objects on the carriage may be manipulated without interference from the dogs. Finally, the construction of my dogging apparatus is relatively simple and there are few moving parts, the foregoing advantages therefore being obtained at minimum cost.

Having now described my invention in preferred embodiments, I claim:

1. A sawmill carriage dogging apparatus including a knee frame comprising an upper dog, the shank of the upper dog being substantially U-shaped with the open end of the U directed downwardly, a lower dog with a substantially straight horizontal shank, a link member pivotally attached to the frame at one of its ends and to the central portion of the shank of the lower dog at the other of its ends, thereby supporting the shank of the lower dog intermediate its ends, a track means integral with said frame, track engaging means connected adjacent the dogging ends of said upper and lower dog shanks for guiding the paths of travel of said dogs, a rigid link pivotally interconnected at one end to the non-dogging end of the upper dog shank and at its other end to the non-dogging end of said lower dog shank, and motor means pivotally interconnected between the frame and the shank of the upper dog at the top portion of the U in said shank, so that the motive forces created by said motor act to move the two dogs in opposing directions.

2. The sawmill carriage dogging apparatus of claim 1 wherein the motor means comprises a fluid operated cylinder.

3. The sawmill carriage dogging apparatus of claim 1 wherein the motor means comprises a pneumatic cylinder.

4. The sawmill carriage dogging apparatus of claim 1 wherein the motor means comprises a hydraulic cylinder.

5. The sawmill carriage dogging apparatus of claim 1 wherein the motor means comprises a rotary motor and rack.

6. A sawmill carriage dogging apparatus including a knee frame comprising an upper dog, the shank of the upper dog being substantially U-shaped with the open end of the U directed downwardly, a lower dog having a substantially straight horizontal shank, a link member pivotally attached to the frame at one of its ends and to the central portion of the shank of the lower dog at the other of its ends, thereby supporting the shank of the lower dog intermediate its ends, a lower substantially vertically disposed track means integral with said knee frame, a track engaging means connected to the lower dog shank between the dogging end of said dog shank and the pivotal connection with said link member and engaging said lower track for guiding the travel of said lower dog, an upper track means integral with said frame and angularly disposed to and coextensive with said lower track means, a track engaging means connected to the upper dog shank adjacent its dogging end and engaging said upper track for guiding the travel of said upper dog, a rigid link pivotally interconnected at one end to the non-dogging end of the upper dog shank and at its other end to the non-dogging end of said lower dog shank, and motor means pivotally interconnected between the frame and the shank of the upper dog at the top portion of the U in said shank, so that the motive forces created by said motor act to move the two dogs in opposing directions.

BUDD W. ANDRUS.

REFERENCES CITED

The following references are of record in the file of this patent:

UNITED STATES PATENTS

| Number | Name | Date |
|---|---|---|
| 1,590,107 | Martin | June 22, 1926 |
| 1,712,311 | Schnell | May 7, 1929 |
| 1,781,220 | Ferris | Nov. 11, 1930 |
| 1,840,846 | Martin | Jan. 12, 1932 |
| 1,852,364 | Pelton | Apr. 5, 1932 |
| 1,930,004 | Ferris | Oct. 10, 1933 |
| 2,154,038 | Evrell | Apr. 11, 1939 |
| 2,377,236 | Jackson | May 29, 1945 |